Oct. 6, 1964  D. T. AYERS, JR  3,151,532
FLUID PRESSURE MOTOR MECHANISM
Filed April 8, 1963
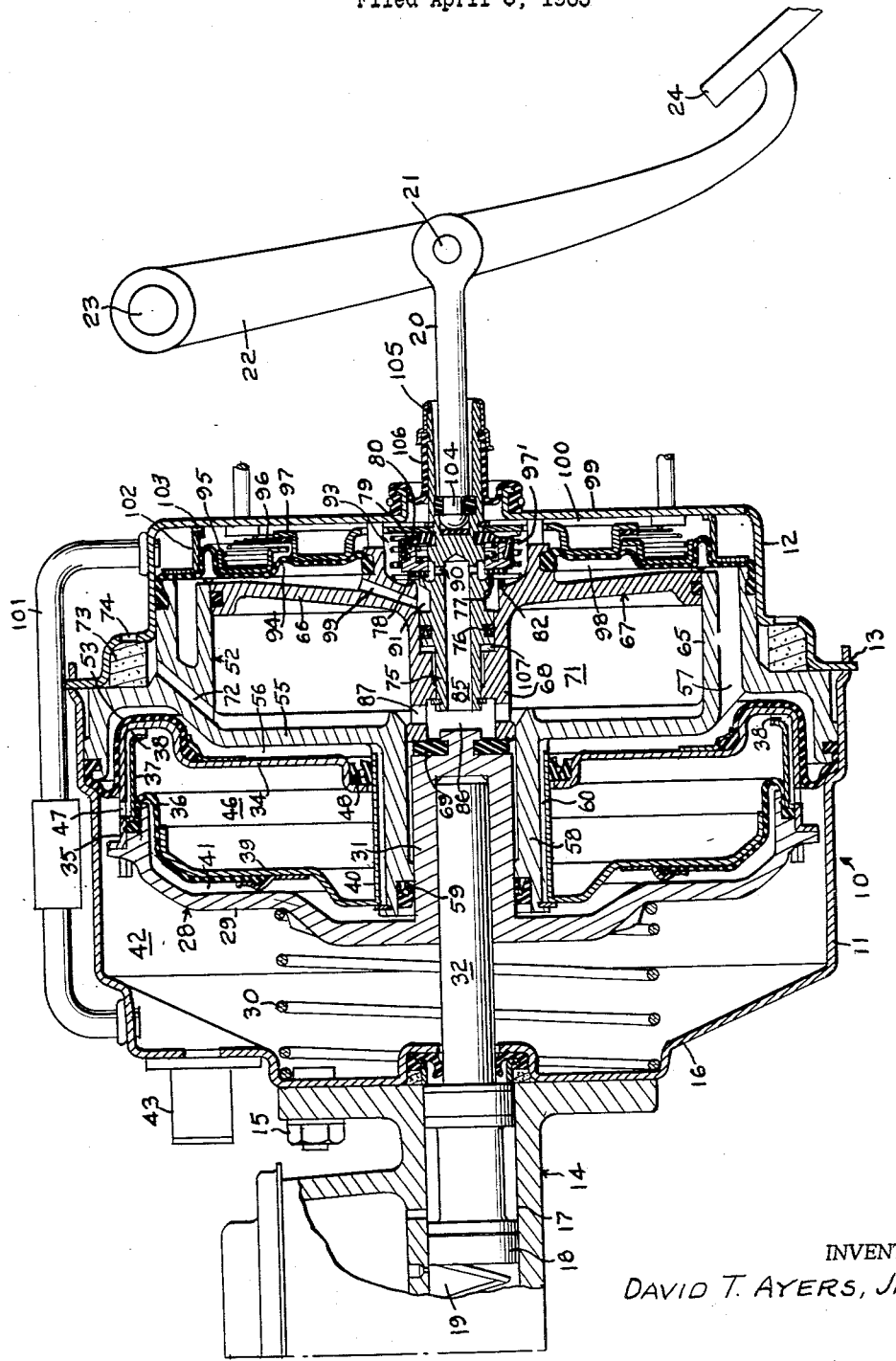
INVENTOR
DAVID T. AYERS, JR.
BY John F. Phillips
ATTORNEY United States Patent Office
3,151,532
Patented Oct. 6, 1964

3,151,532
FLUID PRESSURE MOTOR MECHANISM
David T. Ayers, Jr., Birmingham, Mich., assignor to Kelsey-Hayes Company, Romulus, Mich., a corporation of Delaware
Filed Apr. 8, 1963, Ser. No. 271,073
15 Claims. (Cl. 91—391)

This invention relates to a fluid pressure motor mechanism and is a different embodiment of the structures shown in my co-pending applications Serial Nos. 263,856, filed March 8, 1963, and 271,406, filed April 8, 1963.

In my co-pending applications referred to, I have disclosed motor mechanisms particularly adapted for use for operating the hydraulic brakes of motor vehicles. Such motors are of the full power type as distinguished from booster motors, in the latter of which part of the work is performed by the operator. In my co-pending applications and in the present application, the motor mechanisms require only slight movement of the brake pedal for full power actuation and they provide means whereby, upon a failure in the pressure source for the motor, the brake pedal may be moved an additional distance for the direct pedal operation of the brakes. In each case, the member which is movable by the brake pedal for direct operation of the brakes is held in its off position by motor pressures when the motor is energized, and in the present case and in my co-pending application Serial No. 271,406, referred to above, no spring means is necessary to tend to hold the force transmitting means for pedal operation in its normal position, since differential pressures are provided for this purpose when the parts are in their normal off positions.

Another important feature of the co-pending applications and the present one lies in the fact that a dual motor is provided having two pressure responsive elements, thus providing added power with a motor of limited diameter.

A further important object of the pressent invention is to provide a novel simplified arrangement of parts wherein the axially movable normally stationary unit through which pedal forces are applied for direct brake operation is maintained in position under normal conditions, even when the motor is inoperative, by differential pressures.

A further object is to provide such a motor mechanism wherein the normally stationary unit referred to comprises a piston having one side exposed to atmosphere and the other side exposed to vacuum to normally maintain the unit in its off position, and which pressures are balanced when the motor is fully energized, or when the vacuum source fails, thus requiring substantially less force for the pedal operation of the brakes.

A further object is to provide such a motor mechanism having novel means for connecting to the atmosphere the chamber at one side of the piston of the stationary unit. and to provide a novel arrangement of the valve mechanism which is supplied with atmospheric pressure from the atmospheric chamber referred to.

A further object is to provide a motor mechanism of the character referred to wherein the motor is provided with two vacuum chambers and two variable pressure chambers in alternate relationship, and wherein the operation of the valve mechanism to supply air to such variable pressure chambers also supplies air to an auxiliary vacuum chamber at one side of the piston of the normally stationary unit so that progressive energization of the motor reduces differential pressures tending to hold the normally stationary unit in normal position, and wherein increased pressures in the auxiliary chamber referred to are utilized for providing reaction against the brake pedal.

Other objects and advantages of the invention will become apparent during the course of the following description.

In the drawing I have shown one embodiment of the invention. In this showing

The figure is an axial sectional view through the motor showing a portion of the master cylinder.

Referring to the drawing, numeral 10 designates the motor as a whole comprising casing sections 11 and 12 fixed together in any suitable manner as at 13. A master cylinder 14 is fixed as at 15 to the adjcent head 16 of the adjacent casing section 11 and has the usual bore 17 in which is slidable a plunger 18 to generate pressures in a chamber 19 for the displacement of fluid to the vehicle wheel cylinders (not shown). The motor is energized by operation of a push rod 20, in a manner to be described. The push rod 20 is pivoted as at 21 to a brake pedal 22 pivotally supported at its upper end as at 23 and having the usual pedal pad 24 at its lower end.

Within the motor is arranged a pressure responsive unit indicated as a whole by the numeral 28. The unit comprises a preferably die cast body 29 engaged by a return spring 30 by which the unit 28 is biased to its off position. The body 28 is provided with a hub portion 31 in which is arranged one end of a push rod 32 connected to or engaging the plunger 18 to transmit force thereto.

The unit 28 further comprises a plate 34 having an outer portion 35 which is substantially cylindrical and is fixed to the outer periphery of the body 29. The outer periphery of a diaphragm 36 is fixed to the body 28 by a retaining ring 37 grooved at spaced points 38 for a purpose to be described. The inner periphery of the diaphragm 36 is fixed to a stationary plate 39 and at its inner periphery, this plate extends rearwardly in a cylindrical flange 40 for a purpose to be described. The diaphragm 36 and plate 39 form a stationary wall in the motor and such wall forms with the body 29 a variable pressure chamber 41, while the body 28 forms with the adjacent end of the motor casing a constant vacuum chamber 42 adapted for connection with a suitable vacuum source through a fitting 43.

The plate 34 forms with the stationary wall referred to a second vacuum chamber 46 communicating with the chamber 42 through the grooves 38 and through a port 47 formed in the outer flange 35 of the plate 34. The plate 34 forms a part of the second pressure responsive element of the motor and has its inner periphery sealed as at 48 with respect to the cylindrical portion 41 of the plate 39, which plate is stationary as described below.

Within the rear or right-hand end of the motor is arranged a stationary body 52 fitting at its rear end in the rear portion of the casing section 12 and at its forward end within the rear portion of the casing section 11. The periphery of the forward end of the body 52 clamps in position the outer bead of a diaphragm 53 which is adapted to roll on the flange 35, the inner periphery of the diaphragm being fixed to the plate 34 as shown. The plate 34 and diaphragm 53 form the second pressure responsive element of the motor which is fixed to move with the body 29 through the connection of the flange 35 therewith. The body 52 includes a wall 55 forming with the second pressure responsive element of the motor a variable pressure chamber 56. The passages 57 through the body 52 communicate at one end with the chamber 56. As referred to below, all four of the motor chambers described are normally connected to a source of vacuum and variable pressure chambers 41 and 56 are connected to the atmosphere upon operation of the valve mechanism to be described.

The inner extremity of the wall 55 is formed integral with a forwardly extending cylinder 58 in which the hub 31 is adapted to slide in sealed relation as at 59. The cylindrical flange 40 fits over the cylinder 57 and the latter is grooved as at 60 to afford communication between the chambers 41 and 56.

The body 52 is provided with a cylinder 65 in which is slidable a piston 66 forming part of a normally stationary unit 67 having an axial hub portion 68 abutting a rubber bumper 69 carried by the hub 31. The piston 66 forms with the cylinder 65 an atmospheric chamber 71. This chamber is in communication with the atmosphere through a port 72 formed in the body 52. The casing section 12 retains in position an air cleaner 73 open to the atmosphere through ports 74 in the casing section 12, and air is supplied to the chamber 71 through the air cleaner 73 and passage 72.

A valve body 75 is slidable in the hub 68 in sealed relation therewith as at 76 and carries a valve 77 engageable with a valve seat 78 carried by a thimble 79 sealed with respect to the valve body 75 and movable relative thereto by means of a diaphragm 80. The hub 68 carries a valve 82 normally disengaged from the seat 78.

The valve body 75 is provided with a bore 85 open to a chamber 86 in the hub 68, and this chamber, in turn, is open through ports 87 to the chamber 71.

The space within the valve 77 is open to the passage 85 through ports 90, but since the valve 77 is normally closed, a chamber 91 around the valve body is disconnected from the atmosphere.

A diaphragm 94 is fixed at its inner periphery to the unit 67 and has its outer periphery fixed to the body 52. The diaphragm 94 passes over a plate 95 spring-pressed forwardly as at 96 and having its inner periphery movable into engagement with a plate 97, the inner periphery of which is fixed to the valve body 75. A spring 97' is arranged between the plate 97 and the body 67 to urge these members apart. The diaphragm 94 forms with the piston 66 a variable pressure chamber 98 communicating with the chamber 91 through a passage 99. The valve 82 being normally open, vacuum normally exists in the chamber 91. The chamber 98 constitutes an auxiliary variable pressure chamber from which pedal reaction is controlled as described below, and this chamber communicates with the passages 57. The diaphragm 94 forms with the adjacent end wall 99' of the casing section 12 a vacuum chamber 100 connected through a jumper line 101 with the vacuum chamber 42. A retaining ring 102 fits against the outer portion of the diaphragm 94 and has its rear portion seated against the wall 99'. The ring 102 is notched as at 103 so that the jumper line 101 communicates with the inner portions of the chamber 100.

The push rod 20 is connected as at 104 with the valve body 75, and this body has a portion 105 extending through the end wall 99' and sealed with respect thereto by a boot 106. The valve body 75 has lost motion connection at 107 with the hub 68, within the limits of which lost motion, the valve mechanism is operative by the pedal 22 without transmitting force to the normally stationary unit 67.

*Operation*

Vacuum is maintained in the chamber 42 from the source through fitting 43, and such vacuum is communicated to the chamber 46 through ports 47 and grooves 38. The jumper line 101 maintains vacuum at all times in the chamber 100. The chamber 71 will be in constant communication with the atmosphere through the air cleaner 73, and such atmospheric pressure, of course, will be maintained in the passage 85. Since the valve 82 is open, vacuum will be communicated to the chamber 98, and through passages 57 to the chamber 56. This chamber, in turn, communicates through the grooves 60 with the chamber 41. Accordingly, vacuum exists in all of the motor chambers except the chamber 71.

Upon movement of the brake pedal 22, the push rod 20 will move the valve body 75 to the left and the conventional spring within the thimble 79 will cause the seat 78 to follow the valve 77 until the valve seat engages the valve seat 82. The valves will now be in lap position. Under such conditions, the chamber 91 will be disconnected from the source of vacuum. Slight additional movement of the push rod 20 causes the valve 77 to move away from the seat 78, and air will flow from the passage 85 into the chamber 91, into the chamber 98, through passages 57 into the chamber 56, and through grooves 60 into the chamber 41. The increase in pressure in the chambers 41 and 56 now moves the pressure responsive unit to the left to actuate the master cylinder plunger 18 to apply the brakes in the usual manner.

As stated, atmospheric pressure is always present in the chamber 71, and when air is admitted into the chamber 98, the pressure usually will not rise to atmospheric pressure, and accordingly, sufficient differential pressure will remain on opposite sides of the piston 66 to maintain the normally stationary member 67 in its normal position shown. As pressure increases in the chamber 98 while vacuum is maintained in the chamber 100, differential pressures on opposite sides of the diaphragm 94 will progressively increase. Initially, pressure against the portion of the diaphragm 94 engaging the plate 97 will transmit initial reaction to the push rod 20, while the spring 96 will maintain the plate 95 out of engagement with the plate 97. When pressure in the chamber 98 increases to a predetermined point, the counter-reaction spring 96 will be overcome and the plate 95 will engage the plate 97 to transmit a second stage of reaction to the push rod 20 and thus to the brake pedal.

Assuming that there is a complete failure in the source of vacuum due, for example, to the rupturing of a line connected to the fitting 43, operation of the brake pedal will fail to establish the necessary motor-energizing differential pressures and atmospheric pressure will be present in all of the motor chambers. Thus, the piston 66 will be pressure-balanced, and operation of the brake pedal will take up lost motion at the point 107 to move the body 67 and transmit movement through the bumper 69 to the hub 31 to operate the master cylinder plunger 18. While appreciable force will be necessary to overcome the spring 30 under such conditions, it will be noted that the loading of the spring 30 need not be substantial, in view of the relatively free movement of the pressure responsive unit 28 due to the use of the diaphragms 36 and 53.

It will be apparent that if the motor is energized to the point of power "run-out," that is, when the motor is energized to its maximum extent, atmospheric pressure will exist in the chambers 71 and 98, and the operator may push the brake pedal 22 beyond its normal valve-operating limits to pedal-assist the motor in applying the brakes.

Assuming that for some reason, insufficient vacuum is available, for example, due to leakage, for the full application of the brakes by the motor, the same pedal operation may be effected. Under such conditions, due to the admission of air to the chamber 98, there will be no difference in pressure on opposite sides of the piston 66, and the operator may readily pedal-operate the body 67 to add to the available differential pressures for applying the brakes.

From the foregoing it will be apparent that the present mechanism provides a simplified and highly efficient motor mechanism for applying vehicle brakes by power, assisted, if necessary or desirable, by added pedal forces. It also will be apparent that if the source of vacuum fails completely, the brakes will be fully pedal-operable. Where the expression "failure in said vacuum source" occurs in the claims, it is to be understood that this expression is not limited to a complete vacuum failure, but includes also failure of the vacuum source to maintain the desired motor operating differential pressures. The chamber 71 is always open to the atmosphere and provides novel means in conjunction with the air cleaner 73 for supplying atmospheric pressure to the axial passage 85 to supply air to the variable pressure chambers of the motor when the pedal is operated.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a casing, a pressure responsive unit in said casing formed of a pair of elements connected together to move as a unit, a pair of stationary walls forming with said elements and with said casing alternate low pressure and variable pressure chambers, a fixed body of which one of said walls is a part, said low pressure chambers communicating with each other and said variable pressure chambers communicating with each other, a valve mechanism normally establishing communication between all of said chambers and movable to connect said variable pressure chambers to a source of higher pressure, said valve mechanism comprising a manually operable member, a normally stationary unit movable axially of the motor in sealed relation to said fixed body and carrying a portion of said valve mechanism, said normally stationary unit forming with said fixed body a high pressure chamber communicating with said higher pressure source and communicating with said valve mechanism, and means forming with said normally stationary unit an auxiliary variable pressure chamber controlled by said valve mechanism and normally connected to a lower pressure source to maintain said normally stationary unit in its normal off position by differential pressures, said manually operable member being engageable with said normally stationary unit and the latter engaging said pressure responsive unit whereby, upon a failure of said valve mechanism to establish differential pressures in the motor, pressures will be balanced on opposite sides of said normally stationary unit to render the latter movable to operate said pressure responsive unit upon movement of said manually operable member.

2. A motor mechanism according to claim 1 wherein said fixed body forms a cylinder, said normally stationary unit comprising a piston slidable in said cylinder.

3. A motor mechanism according to claim 1 provided with means responsive to increased pressures in said auxiliary variable pressure chamber for reacting against movement of said manually operable member.

4. A motor mechanism according to claim 1 wherein said fixed body forms a cylinder, said normally stationary unit comprising a piston slidable in said cylinder, and means controlled by pressure increases in said auxiliary variable pressure chamber incident to operation of said valve mechanism for reacting against movement of said manually operable member.

5. A motor mechanism comprising a casing, a pressure responsive unit in said casing formed of a pair of elements one of which is a body having a hub portion and the other of which is connected to said body at its periphery, a pair of stationary walls forming with said elements and said casing alternate variable pressure and low pressure chambers, the latter of which communicate with each other and with a source of low pressure, said variable pressure chambers communicating with each other, a valve mechanism comprising a manually operable member normally connecting all of said chambers to each other and movable to connect said variable pressure chambers to a higher pressure source, a fixed body of which one of said walls forms a part, said body having an axially extending sleeve portion in which said hub is slidable and with respect to which said other element is slidable, a normally stationary unit slidable in said fixed body and forming therewith a high pressure chamber communicating with said higher pressure source and with said valve mechanism, an auxiliary variable pressure chamber formed at the side of said normally stationary unit opposite said high pressure chamber, the latter chamber being normally connected to said lower pressure source and connectible to said higher pressure source by operation of said valve mechanism whereby normal differential pressures on opposite sides of said normally stationary unit tend to hold it in its normal position and which differential pressures are reduced upon operation of said valve mechanism, said manually operable member being engageable with said normally stationary unit and the latter engaging said hub whereby failure of low pressure in said auxiliary chamber frees said unit for movement by said manually operable member to move said hub.

6. A motor mechanism according to claim 5 provided with a pressure responsive device forming one wall of said auxiliary variable pressure chamber, and means operable by increased pressures in said auxiliary chamber for transmitting reaction forces to said manually operable member.

7. A motor mechanism according to claim 5 provided with a pressure responsive device forming one wall of said auxiliary variable pressure chamber, means operable by increased pressures in said auxiliary chamber for transmitting reaction forces to said manually operable member, and means operable by said pressure responsive device when pressures increase above a predetermined point in said auxiliary chamber for increasing the degree of reaction transmitted to said manually operable member in proportion to the pressure increases in said auxiliary chamber.

8. A motor mechanism according to claim 5 wherein said fixed body forms a cylinder, said normally stationary unit comprising a piston slidable in said cylinder.

9. A motor mechanism according to claim 5 wherein said fixed body forms a cylinder, said normally stationary unit comprising a piston slidable in said cylinder, an annular diaphragm forming one wall of said auxiliary chamber and fixed at its inner and outer peripheries respectively to said normally stationary unit and said fixed body, and means for utilizing movement of a portion of said diaphragm incident to pressure increases in said auxiliary chamber for reacting against movement of said manually operable member.

10. A motor mechanism according to claim 9 provided with means for utilizing movement of another portion of said diaphragm when pressures in said auxiliary chamber increase above a predetermined point for increasing the reaction against movement of said manually operable member.

11. A motor mechanism comprising a casing, a pressure responsive unit in said casing formed of a pair of pressure responsive units one of which is a movable body having a hub and the other of which is a movable plate spaced from said body and connected thereto, a pair of stationary walls one of which is arranged between said body and said movable plate and has a diaphragm connected between said one stationary wall and said body, said movable plate and said one stationary wall forming therebetween a vacuum chamber, said body and one end of said casing forming a second vacuum chamber communicating with said first-named vacuum chamber, a fixed body having a portion forming the other stationary wall and forming with said movable plate a variable pressure chamber, said movable body and said one stationary wall forming therebetween a variable pressure chamber, said fixed body having a sleeve portion surrounding said hub, said one stationary wall having a sleeve surrounding said sleeve portion of said fixed body, said sleeves being provided therebetween with a passage connecting said variable pressure chambers, a normally stationary unit engaging said hub and having sealed engagement with said fixed body and forming therewith an atmospheric chamber open to the atmosphere, means forming with said stationary unit an auxiliary variable pressure chamber at the side of such unit opposite said atmospheric chamber, and a valve mechanism, comprising a manually operable member, normally connecting all of said chambers to a source of vacuum and operable for connecting said variable pressure chambers to said atmospheric chamber, normal differential pressures in said atmospheric chamber and said auxiliary chamber maintaining said normally stationary unit in a normal position, failure of vacuum in said auxiliary chamber freeing said normally stationary unit for movement by said manually operable member to effect movement of said hub.

12. A motor mechanism according to claim 11 wherein said means forming said auxiliary chamber comprises a diaphragm, and means for utilizing movement of a portion of said diaphragm incident to increased pressures in said auxiliary chamber for reacting against movement of said manually operable member.

13. A motor mechanism according to claim 11 wherein said means forming said auxiliary chamber comprises a diaphragm, means for utilizing movement of a portion of said diaphragm incident to increased pressures in said auxiliary chamber for reacting against movement of said manually operable member, and means for utilizing movement of another portion of said diaphragm when pressures in said auxiliary chamber increase above a predetermined point for additionally reacting against movement of said manually operable member.

14. A motor mechanism according to claim 11 wherein said means forms with the adjacent end of said casing a vacuum chamber connected to said source of vacuum, said means comprising a diaphragm connected at its inner and outer peripheries respectively to said normally stationary unit and to said fixed body, and means for utilizing movement of said diaphragm when pressures increase in said auxiliary chamber for reacting against movement of said manually operable member.

15. A motor mechanism according to claim 11 wherein operation of said valve mechanism connects said auxiliary chamber to said atmospheric chamber, said fixed body having a passage connecting said auxiliary chamber to one of said variable pressure chambers to increase pressure in the latter when pressure increases in said auxiliary chamber.

References Cited in the file of this patent

UNITED STATES PATENTS

| | | |
|---|---|---|
| 2,989,035 | Stelzer | June 20, 1961 |
| 3,016,880 | Kellogg | Jan. 16, 1962 |
| 3,075,499 | Prather | Jan. 29, 1963 |
| 3,076,441 | Ayers | Feb. 5, 1963 |
| 3,078,677 | Cripe | Feb. 26, 1963 |
| 3,083,698 | Price et al. | Apr. 2, 1963 |